UNITED STATES PATENT OFFICE.

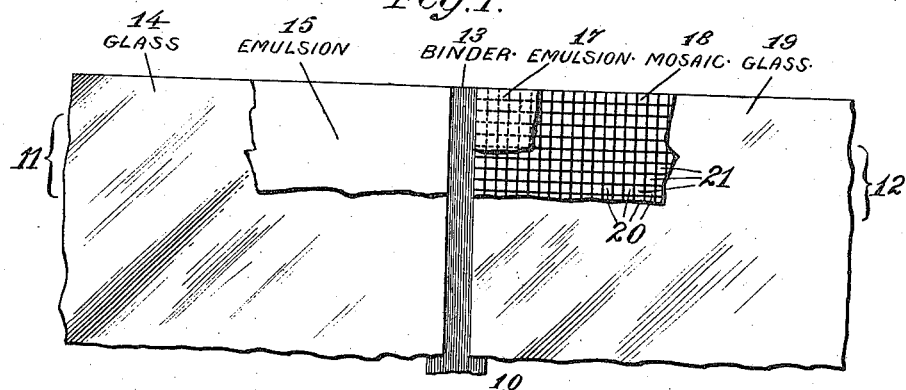
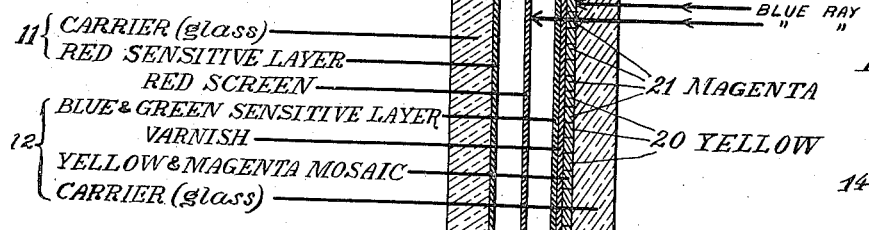
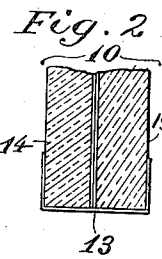
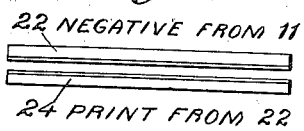
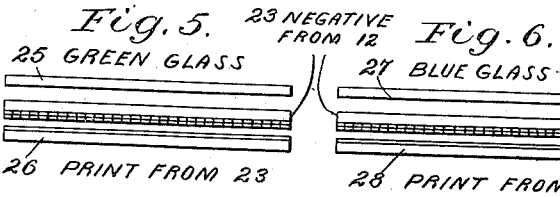
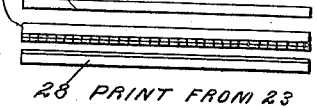
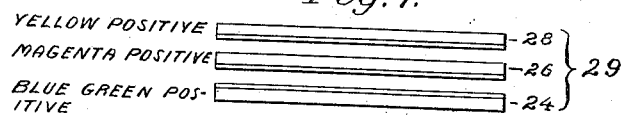

FREDERIC EUGENE IVES, OF PHILADELPHIA, PENNSYLVANIA.

COLOR PHOTOGRAPHY.

1,268,847.

Specification of Letters Patent.

Patented June 11, 1918.

Application filed January 15, 1917. Serial No. 142,383.

*To all whom it may concern:*

Be it known that I, FREDERIC EUGENE IVES, a citizen of the United States, residing at Philadelphia, in the county of Philadelphia and State of Pennsylvania, have invented certain new and useful Improvements in Color Photography, of which the following is a specification, reference being had therein to the accompanying drawing.

My invention relates to the art of color photography, and more particularly to an improved system of color photography in three colors wherein the set of negatives obtained is novel and advantageous, as also the method of securing such negatives and the method of proceeding from such negatives to secure the trichromatic positive, or final picture, which may be a print on paper or a transparency. The assemblage of sensitive members or plates and also the final print or picture hereof are likewise *per se* novel.

Heretofore two general systems have been recognized for securing and utilizing negatives in making trichromatic prints. In one system, which may be referred to as the three-color-mosaic system and which is typically represented by the Lumiere process, Patent #877,351, of January 21, 1908, or that of McDonough #611,457, of September 27, 1898, the sensitive photographic layer is laid over a mosaic of microscopic areas of the three primary colors, red, green and blue, distributed in suitable manner and proportions; and the exposure is made through this mosaic so that development yields a mosaic negative representative of the three colors. Among the disadvantages of this system may be mentioned the necessity of apportioning the miscroscopic areas between the three primary colors so that each color occupies in the aggregate considerably the smaller part of the total area of exposure. This difficulty is enhanced by reason of the fact that red light has very little actinic power and, therefore, requires proportionately an unduly large fraction of the total area. It is objectionable that the red element of the image should be divided up at all into mosaic pattern and desirable, instead, that the red representation should occupy 100% of the negative on which this color is represented. A further objection to this process is in connection with the use of bichromated colloid in making the positives. The green and blue elements of the picture may be printed directly on the bichromated gelatin, but the latter is quite insensitive to red light so that the triple mosaic is practically unavailable for the making of positives by the bichromated colloid method. In using the term mosaic throughout this specification, I include any pattern or arrangement whatever of minute areas whether in squares, circles or other small figures or stripes, waves, or the like.

The other general system of three-color photography partially overcomes the objections above mentioned to the triple mosaic system, but only at the expense of introducing other difficulties. This may be referred to as the three-negative system, the usual process being to expose in the camera three plates each sensitive to, and subjected to, light of the three primary colors, red, green and blue, respectively. This gives a negative for each of the colors in which the representation of that color occupies the whole of the plate; neither the red nor the other negatives show any pattern or structure, and all of the negatives may be printed upon bichromated colloid.

The three-negative system, however, requires either a special camera, such, for example, as that of my prior Patent No. 1,153,229, of September 14, 1915, in order to locate the sensitive plates at different sides of the camera, or else the disadvantage of three exposures successive in time, or else a special plate pack or plate block, such as is shown in my prior Patents Nos. 927,244 of July 6, 1909, or 1,173,429 of February 29, 1916, wherein the three sensitive plates are superposed. The last mentioned gives an unduly thick pack or block and, moreover, necessarily separates the foremost sensitive layer from the rearmost one to an appreciable extent, thus precluding perfect focusing and sharpness of all of the images and introducing a certain amount of diffusion of light, all of which sometimes makes the negatives insufficiently perfect in definition for exact or scientific purposes.

For the purpose of overcoming all of the above mentioned objections and securing other advantages, which will appear in the following description or will be apparent to those skilled in the art, the present invention consists in the new process of producing negatives, and in the new plate pack or plate set for this purpose, and in the new set of resulting negatives, and in the new process of producing positives from such negatives, and in the blended final picture or positives, all hereinafter described or illustrated.

The general principle underlying the present invention is to provide but two sensitive members so as to produce but two negatives, respresentative of all three colors; from which two negatives the desired prints or positives can be made and blended into a single three-color picture. Stated in another way, the principle of the invention is to employ a mosaic screen or layer in connection with one sensitive member, the mosaic adapted to afford a selection of two primary colors, and exposing the same in face to face contact with another or monochrome sensitive layer for the third of the primary colors. The rays of mixed light pass through the mosaic, and then affect the sensitive layer which is sensitive to the first two primary colors, and then pass on to the other sensitive layer sensitive to the third color; so that on development I procure two negatives, one having a mosaic pattern, representative of two primaries, and the other plain or non-mosaic, representative of the third primary.

Specifically I prefer to employ a mosaic of the secondary colors, yellow and magenta, to the rear of which is a layer sensitive to blue and green but not to red, and to the rear of these is a red sensitive layer which is either insensitive to blue and green or has these colors screened off by a thin red color screen or by a superficial red dye, or by a body staining of this color. By this arrangement the red rays of light, or the red component of the image, passes through all parts of the mosaic, and passes without effect through the blue and green sensitive layer, and through the red screen, so as to reach and actinically affect the red sensitive layer. The green rays will pass through the yellow portions of the mosaic but are excluded by the magenta portions, so that the green light makes an exposure in a mosaic pattern on the sensitive layer to the rear of the mosaic, and is subsequently cut off from reaching the red sensitive layer to the rear of that. Similarly the blue component of the light passes through the magenta areas of the mosaic but is excluded by the yellow areas, thus giving a mosaic exposure on the front sensitive layer, and being cut off by the red screen from the rear sensitive layer. On development I have a plain negative representing the red and a mosaic negative representing the green and blue, from which latter, by the aid of green light, then blue light, may be printed two positives. The blue-green positive from the red-representing negative, the magenta positive from the green-representing portions of the mosaic negative, and the yellow positive from the blue-representing portions of the mosaic negative may then be combined or blended, for example, by superposing in the manner of my Patent No. 1,122,935 of December 29, 1914, or by imbibition in the manner of my Patents Nos. 1,106,816 of August 11, 1914, or 1,121,187 of December 15, 1914, to form the finished or final trichromatic color-photograph.

Since certain parts of the present invention are susceptible of illustration by drawings, I will, in stating a full disclosure of the practice of the present invention, refer for convenience to the annexed drawings forming a part hereof, in which Figure 1 represents, more or less diagrammatically and with exaggeration, a pair of sensitive members embodying and adapted to the practice of the present invention, these shown as opened out into their developing or printing position. Fig. 2 shows the same in cross-section with the two members folded together so that the sensitive surfaces are in face to face contact ready for exposure in an ordinary camera and plate holder. Fig. 3, in an exaggerated diagram or cross-section, shows the arrangement and structure of the sensitive members and the travel of the rays of light of the primary colors therethrough. Fig. 4 indicates in side elevation the printing from the first or plain negative of a corresponding monochrome positive. Fig. 5 similarly indicates the printing of a monochrome positive from the mosaic negative, and Fig. 6 indicates the printing of a different monochrome from the same mosaic negative. Fig. 7 shows one mode in which the three positive images may be blended, namely, by actual superposition, and Fig. 8 indicates the same secured permanently together in registry, thus constituting the final trichromatic or three-color photograph.

I will first describe the nature of the plate set or plate pack and its components or members and the different layers composing the same, these in themselves constituting a novel photographic article or commodity; and I will thereafter describe the novel mode or process involving the use of the same, and the novel negative set resulting therefrom, and the novel procedure in securing three-color positives from the negatives.

The entire pack or set 10 of sensitive members is shown opened out in Fig. 1 and folded together in Fig. 2. This comprises, not three, but only two sensitive members, the rear member 11 and the front member 12 placed in close face to face contact so that the two sensitive layers are in practically the same focal plane. For convenience in handling, the two members may be secured together by a binding strip 13 along one or more edges, thus constituting an entity of the plate set, so that it may be used as a pack and inserted as an ordinary single plate in the camera or plate holder, and thus exposed without any special apparatus or difficulty.

In describing the makeup of the rear and front components 11 and 12, reference should also be had to Fig. 3 where the different layers are illustrated in exaggerated manner and separated from their proper or normal contacting position. It should be explained that for the purposes of illustration, I have made a certain selection of the primary and secondary colors which will be utilized throughout this description, but it will be understood that a different selection thereof would come within the purport of the invention if utilized on the same principles.

The rear member 11 of the plate pack 10 is preferably the red sensitive member and it comprises a carrier 14 which is transparent, for example, glass, at the front of which is a photographic layer 15 sensitized or sensitive to red.

Since blue light is far more actinic than red it is safer to entirely shut off all but the red rays, and this may be done by a superficial red layer or otherwise and in Fig. 3 I have indicated a red screen 15ª, this being shown as a separate layer simply for diagrammatic reasons, although if sufficiently thin it might be so used as an inset.

One of the two members of the plate pack, according to this invention, is to be a mosaic member and I prefer that the front member shall be the mosaic one, although in some aspects the invention could be utilized by passing the light first through the non-mosaic member.

The front plate pack member 12 may be described, beginning from its rear side, as comprising first a layer 17 which is sensitive to both blue and green light. In front of or beneath the sensitive layer 17 is a mosaic 18 supported on a suitable carrier 19, preferably of glass. The mosaic will preferably be coated with a layer of varnish 18ª to protect the color pattern from injury during the developing and other processes.

By constructing the mosaic layer 18 of a fine pattern of yellow and magenta areas, this layer is capable of passing the red light through for the purpose of exposing the rear member, while the little yellow and magenta areas respectively select the green and the blue and shut out the blue and the green rays so that the exposure of the front sensitive layer 17 is representative both of the green and blue components of the image, in minute patterns.

The rear sensitive member 11 need not be specially produced, as any suitable commercial red sensitized photographic plate will serve, but I prefer that the front sensitive member 12 shall have the special characteristics already mentioned, and I will now describe a practical and convenient manner in which such a member may be manufactured.

By taking a sheet of plain glass and first coating it with fine grained gelatin the mosaic may be produced by applying colors to the gelatin in suitable pattern. I have merely, for convenience, indicated a square pattern, although the pattern might be composed of triangles, hexagons, lines, zigzags, waves, or other patterns that have been heretofore proposed in mosaic three-color photography.

I may first print upon the gelatin surface with a suitable printing apparatus, and by the use of a greasy ink of a carmine or magenta color, a pattern of small dots or squares, leaving unprinted portions between the same. By then immersing this in a solution of yellow dye such as sodium salt of disulfo-stilbene-disazo-bi-phenol brilliant yellow, the between-dot spaces will become stained to that color. Since the dye is soluble I protect the mosaic surface by a suitable waterproof coating or varnish 18ª such, for example, as amyl acetate collodion. Over this is spread the blue-green sensitive emulsion 17.

Assuming the square mosaic pattern, every alternate unit of area on each row and each column may be considered a yellow square or area 20, and the alternate areas or squares 21 may be considered as magenta colored as indicated in Figs. 1 and 3.

Fig. 3 shows the relative position in which the members stand during exposure in the camera and the diagram indicates the travel of rays of light of the three primary colors, red, green and blue, respectively, passing through each of the two kinds of mosaic areas, yellow and magenta. Thus the topmost red ray is shown passing freely through the yellow square 20 and through the varnish coating 18ª and the sensitive layer 17 to the red screen 15ª and red sensitive layer 15. Similarly the red ray passing through the magenta area 21 of the mosaic reaches the red sensitive layer. The green and blue rays, however, are all shut off, either by the mosaic screen and its sensitive coating or by the red screen 15ª, from reaching the red sensitive layer.

The first green ray is shown passing through a yellow mosaic area so as to reach the sensitive layer 17. Yellow is a secondary color and admits the passage of green light as readily as would a green screen. In fact, the yellow areas of the mosaic constitute tiny screens which admit the passage of both green and red but exclude blue. The green ray which strikes the magenta area 21 is unable to pass through the mosaic and, therefore neither sensitve layer is affected by the green rays at this portion of the image.

Magenta, like yellow, is a secondary color and it freely admits the passage of red rays and blue rays, but excludes green. These magenta areas may be modified slightly from a true secondary color by the incorporation of a slight tinge of yellow so as to soften the actinic effect of the blue rays which, in any case, are in excess of that of the green rays, or this modification of the light may be effected as has been proposed in color protography by an equalizing screen of suitable color combined with or to the rear of the lens.

The first blue ray is shown as striking against without passing through the yellow areas 20 of the mosaic, while the second blue ray is shown as passing through the magenta area 21 and thus affecting the sensitive layer 17, without, however, passing to the red sensitive layer 15.

By such exposure of the sensitive members and suitable development of the images, we procure two negatives. The first negative 22 developed from the sensitive member 11 is a plain or non-mosaic negative, as indicated in Fig. 4, and its pattern is representative of the red portions of the image.

The exposed member 12 develops into a mosaic negative 23, shown in Figs. 5 and 6, which consists of the glass base, the mosaic colored layer and the black and white mosaic negative layer representative of green and blue in its different mosaic areas.

Owing to the fact that the member 11 faces forwardly and the member 12 rearwardly, the negative 22 will be unreversed and the negative 23 will be a reversed negative. This is an advantage in that it is thus possible to make reversed positives from the mosaic negative which combine or blend readily with an unreversed positive as explained in my aforesaid prior Patent No. 1,122,935.

Coming to the process of making the positive, this is diagrammatically illustrated in Figs. 4 to 8.

From the red-representing negative 22 we produce, in a suitable manner, a print 24 which, according to the theory of composite or subtractive color photography is to be of a blue-green color such as afforded by a ferrocyanid print. Blue-green is the complementary of red.

To secure a magenta colored positive from the green-representing portions of the mosaic negative 23 we proceed, as shown in Fig. 5, by placing a green glass 25 between the light and the negative so that the printing on the member 26 beneath will correspond only to those areas of the mosaic which collectively represent the green components of the image. Similarly as shown in Fig. 6, we use a blue glass 27 to produce a print 28 representative of the blue component of the image, this print to be colored the complementary color yellow.

Instead of transferring the several colored images by imbibition into a single gelatin layer I may proceed simply by superposing the blue-green, magenta and yellow positives, 24, 26 and 28, producing an assemblage 29, as seen in Fig. 7, and which may be made into a permanent three-color print 30, as seen in Fig. 8, by cementing or otherwise securing together the three positives in intimate relation, similar to my said Patent No. 1,122,935 and Patent No. 1,145,143 of July 6, 1915.

Or the production of the positives from the negatives may be under the gelatin bichromate system according to my said prior Patent No. 1,121,187 wherein two or all three of the positives are made in the form of gelatin reliefs immersed in dye to selectively absorb the proper secondary color before the blending of the three monochrome positives. This bichromated colloid system is possible for all three prints, since the colloid is sensitive to green light and to blue light while the red-representing negative is printed, not with red, but with white light.

The method of making positives, disclosed in my prior Patent No. 1,186,000 of June 6, 1916, may be utilized in connection with the negatives 22 and 23 hereof.

The system of color photography, which, as a whole, has been hereinabove disclosed, embodies many separate parts or branches of invention which in some cases may be utilized in quite different modes from those specifically described. Thus, I believe that I am the first to proceed by photographically exposing a plurality of sensitve layers by the aid of a plural-colored mosaic; whether or not such mosaic comprises one or comprises two secondary rather than primary colors; and whether or not one of the sensitive layers is permanently embodied with the mosaic; and whether or not all of the sensitive layers are located to the rear of the mosaic, as has been specifically described. Also I believe that I am the first to proceed by photographically exposing with the aid of a plural-colored mosaic when one or more than one of the mosaic colors are secondary colors, that is complementary to the selected primary colors; and I believe this to be new whether only one or whether more of the secondary colors are comprised in the mosaic; and whether only one or more sensitive members or layers are combined with the mosaic during exposure, and whatever be the particular arrangement of the sensitive layers so long as one of them is to the rear of the mosaic screen. For example, for some purposes it would be an embodiment of a portion of my invention if the mosaic layer is located between a rear sensitive layer and a front sensitive layer; and the color arrangement might be altered so that, for example, a layer sensitive to red and green stands behind the mosaic, the other layer being sensitive to blue and the mosaic in that case being composed of areas of the secondary colors, blue-green and magenta, or, for that matter, blue-green and red, or green and magenta; or, if the blue sensitive layer be in front of the mosaic, the latter might consist simply of green and red areas, so that the penetrating light would first actinically affect the blue sensitive member, which could be very tenuous, and then passing through the mosaic, affect the red and green sensitive member to the rear in a mosaic pattern, which, after development into a negative, could be used for the production of two monochrome positives, blue-green and magenta, to combine with a yellow positive produced from the other negative. It will be understood that the colors mentioned are approximate. It is more convenient to use the term blue-green rather than minus-red for the complementary of the first primary and the term magenta instead of minus-green and the term yellow instead of minus-blue, as frequently done.

For convenience I have described the monochrome positives produced by exposure through the mosaic negative as mosaic monochromes, but it should be explained that the minute pattern of the mosaic would not necessarily appear in the monochrome and would never appear noticeably in the prints. A very minute amount of diffusion of light during the printing would practically wipe out the pattern and it would be very simple to secure this effect in practising the process so that all three of the monochrome positives would be substantially structureless.

It will thus be seen that I have described a complete system of color photography, for example, trichromatic photography, comprising a novel plate set and the process of making such plate set, also a novel negative set and the process of making such negative set, also a novel set of positives or final print and the method of making the same, each of which embodies some portion of my invention and attains the objects and advantages before recited. Since many matters of procedure, arrangement, apparatus, selection of colors and various other details and features may be extensively modified without departing from the underlying principles, it is not intended to restrict the present invention to such features execept in so far as specified in the appended claims.

What I claim is:

1. In the art of color photography the process of producing a sensitive plate set which comprises the following steps: producing a mosaic screen of a plurality of colors of which at least one is a secondary, and combining said mosaic screen with a plurality of differently sensitive films.

2. In the art of color photography the process of producing a sensitive plate set which comprises the following steps: producing a mosaic screen of a plurality of colors of which at least one is a secondary, by printing a pattern in a greasy color and dyeing the unprinted portions in a different color, and combining said mosaic screen with a plurality of differently sensitive films.

3. In the art of color photography the process of producing a sensitive plate set which comprises the following steps: producing a mosaic screen of a plurality of colors of which at least one is a secondary, coating the mosaic with emulsion sensitive to two colors, and assembling the same in face contact with a plate sensitive to a third color.

4. In the art of color photography the process of producing a sensitive plate set which comprises the following steps: producing a mosaic screen of a plurality of colors of which at least one is a secondary, and combining the same with a sensitive film.

5. In the art of color photography the process of producing a sensitive plate set which comprises the following steps: producing a mosaic screen of a plurality of colors and combining the same with a plurality of sensitive members.

6. A sensitive plate set for trichromatic color photography comprising a red sensitive member in face contact with a green-and-blue sensitive layer superposed on a yellow-and-magenta mosaic screen.

7. A sensitive plate set for color photography comprising a plural-colored mosaic combined with a plurality of sensitive layers.

8. A sensitive plate set for color photography comprising a plural-colored mosaic comprising secondary-color areas, combined with a sensitive layer.

9. A sensitive plate set for color photography comprising a plural-colored mosaic comprising secondarly color areas, combined with a sensitive layer sensitive to two primary colors admitted through different areas of the mosaic.

10. A sensitive plate set for color photography comprising a plural-colored mosaic comprising secondary-color areas, combined with a sensitive layer sensitive to two primary colors admitted through different areas of the mosaic, and a second sensitive layer sensitive to the third primary.

11. A sensitive plate set for color photography comprising a mosaic screen consisting of areas of two different secondary colors in combination with a sensitive layer sensitive to the two primaries which are complementary to said secondaries, and a sensitive layer which is sensitive to the third primary.

12. A sensitive plate set for color photography comprising a mosaic screen consisting of areas of two different secondary colors in combination with a sensitive layer sensitive to the two primaries which are complementary to said secondaries, and a sensitive layer which is sensitive to the third primary, both said sensitive layers being located behind the mosaic screen.

13. A sensitive plate set for color photography comprising a mosaic screen consisting of areas of two different secondary colors in combination with a sensitive layer sensitive to the two primaries which are complementary to said secondaries, and a sensitive layer which is sensitive to the third primary, both said sensitive layers being located behind the mosaic screen, and the last mentioned sensitive layer being behind the first mentioned one.

14. A sensitive plate set for color photography comprising a mosaic screen consisting of areas of two different secondary colors in combination with a sensitive layer sensitive to the two primaries which are complementary to said secondaries, and a sensitive layer which is sensitive to the third primary, both said sensitive layers being located behind the mosaic screen, the last mentioned sensitive layer being behind the first mentioned one, and provided with a coloring to exclude light of the first and second primary colors.

15. A sensitive plate set for color photography comprising a mosaic screen consisting of areas of two different secondary colors in combination with a sensitive layer sensitive to the two primaries which are complementary to said secondaries, and a sensitive layer which is sensitive to the third primary, both said sensitive layers being located behind the mosaic screen, the last mentioned sensitive layer being behind the first mentioned one, and in face contact therewith whereby three colors may be recorded on two sensitive layers located in the same focal plane.

16. A sensitive plate set for color photography comprising a mosaic screen at the rear face of which is coated a layer of emulsion sensitive to the first and second primary colors, said screen composed of areas of the two secondary colors complementary to the first and second primaries, whereby light of the third primary color may pass through both kinds of areas of the screen, and a member sensitive to such third primary located to the rear of such mosaic and sensitive layer.

17. A sensitive plate set for color photography comprising a mosaic screen at the rear face of which is coated a layer of emulsion sensitive to the first and second primary colors, said screen composed of areas of the two secondary colors complementary to the first and second primaries, whereby light of the third primary color may pass through both kinds of areas of the screen, and a member sensitive to such third primary located to the rear of such mosaic and sensitive layer, such rear sensitive member facing forward and having a coloring to exclude light of the first and second primary colors.

18. A plate pack for color photography comprising two sensitive members facing each other, the front member consisting of a mosaic screen transmitting blue and green light in pattern, and transmitting red light, and coated at its rear face with a blue- and green-sensitive coating insensitive to red, and the rear member consisting of a carrier bearing a coating sensitive to red and protected from green and blue light.

19. A sensitive plate for color photography consisting of a mosaic screen transmitting blue and green light in pattern, and transmitting red light, and coated at its rear face with a blue- and green-sensitive coating insensitive to red.

20. A sensitive plate for color photography consisting of a mosaic screen composed of areas of a given secondary color, and areas of another color, and coated with a sensitive coating capable of recording different primary colors.

21. In the art of color photography the process of producing a set of two negatives representative of the three primary colors consisting in exposing while in substantial face contact, two separable sensitive layers, one sensitive to the first primary color and the other sensitive to the other primaries, while selectively screening the light by a mosaic pattern composed of areas of the secondary colors complementary to said second and third primaries, whereby the first mentioned layer upon development yields a negative representing the first primary color and the second mentioned layer, a negative in mosaic pattern representing the other two primary colors.

22. A negative set for trichromatic color photography consisting of one unreversed negative made by the action of and representing red light, and one reversed composite negative the areas or elements of which are made by the action of and represent green light and blue light respectively.

23. A negative set for color photography consisting of a plurality of negatives representing different color elements of the same image, one of which negatives is a mosaic patterned negative, different areas of which represent different color elements of the image.

24. A negative set for trichromatic color photography consisting of one unreversed negative made by the action of and representing red light, and one reversed composite negative, the areas or elements of which are made by the action of and represent green light and blue light respectively, the said composite negative having embodied with it a colored mosaic composed of areas which respectively exclude green while transmitting blue light, and exclude blue while transmitting green light.

25. A negative set for trichromatic color photography consisting of one unreversed negative made by the action of and representing red light, and one reversed composite negative, the areas of which are made by the action of and represent green light and blue light respectively, the said composite negative having embodied with it a colored mosaic composed of areas of magenta and yellow respectively.

26. A negative set for color photography consisting of a plurality of negatives representing different color elements of the same image, one of which negatives being a mosaic patterned negative, different areas of which represent different color elements of the image, and a colored mosaic embodied in said mosaic negative.

27. A negative set consisting of a plurality of negatives, one of which is a mosaic parti-colored blue- and green-representing negative, and the other a red-representing negative.

28. A negative consisting of a mosaic screen transmitting blue and green light in pattern and bearing a mosaic blue- and green-representing negative layer.

29. A negative consisting of a mosaic screen composed of areas of a given secondary color, and areas of another color, and bearing a mosaic negative layer representing different primary colors.

30. In the art of color photography the process of producing combinable positives from a negative set, one of which negatives is a mosaic negative combined with a colored mosaic, which consists in successively printing a plurality of prints by exposure by differently colored lights under said mosaic, and printing a print from each other negative of said set.

31. In the art of color photography the process of producing combinable positives from a negative set, one of which negatives is a mosaic negative combined with a colored mosaic, which comprises selectively printing a plurality of positives from said mosaic negative through color screens and printing an additional positive from another of the negatives.

32. A set of combinable positive prints for color photography, one of which is a monochrome complementary to and representative of one primary color in the image, and two of which are reversed mosaic monochromes each complementary to and representative of the two other primary colors.

33. A set of combinable positive prints for color photography, one of which is a bichromated colloid monochrome complementary to and representative of one primary color in the image, and two of which are reversed mosaic monochromes each complementary to and representative of the two other primary colors.

34. The system of color photography consisting in firstly producing two negatives through exposure of two sensitive members while in face contact, by the aid of a secondary color mosaic screen, whereby one negative represents in mosaic two primary colors and the other negative the third primary; and secondly producing from said mosaic negative in succession two monochrome positives and producing a third positive from the other negative; and thirdly suitably combining or blending the so produced three positive monochromes.

In testimony whereof, I have affixed my signature hereto.

FREDERIC EUGENE IVES.

Witnesses:
J. CLEG HEY,
N. O. GELLERT.